Oct. 2, 1951  H. J. HUHNE  2,569,719
STONE PICKER
Filed Dec. 16, 1949  2 Sheets-Sheet 1

INVENTOR
HENRY J. HUHNE
BY
McMorrow, Berman & Davidson
ATTORNEY

Oct. 2, 1951 — H. J. HUHNE — 2,569,719
STONE PICKER
Filed Dec. 16, 1949 — 2 Sheets-Sheet 2

INVENTOR
HENRY J. HUHNE
BY
McMorrow, Berman & Davidson
ATTORNEY

Patented Oct. 2, 1951

2,569,719

UNITED STATES PATENT OFFICE 2,569,719

STONE PICKER

Henry J. Huhne, Melrose, Minn.

Application December 16, 1949, Serial No. 133,308

3 Claims. (Cl. 55—17)

This invention relates to stone pickers, and more particularly to a mobile machine which can be moved over cultivated land to remove from the top portion of the land substantially all stones within a predetermined range of sizes and deposit such stones at selected locations.

It is among the objects of the invention to provide a mobile stone gathering or picking machine of simplified and durable construction which can be hitched to a conventional farm tractor for movement over land to be cleared of stones, and driven by the tractor power take-off connection to raise the stones from the land and place them in a receptacle from which they can be dumped at selected locations, which will gather substantially all the stones within a predetermined size range on or near the surface of the land, but will not be stopped or broken upon encountering highly resistant obstacles, such as large stones, stumps and underground structures, which will pass stones of various sizes and in different quantities therethrough without becoming clogged and without damage to the machine, and which is economical to manufacture, easy to operate, and not subject to malfunctioning in use.

Other objects and advantages will become apparent from a consideration of the following description and the appended claims in conjunction with the accompanying drawings wherein:

Figure 1:
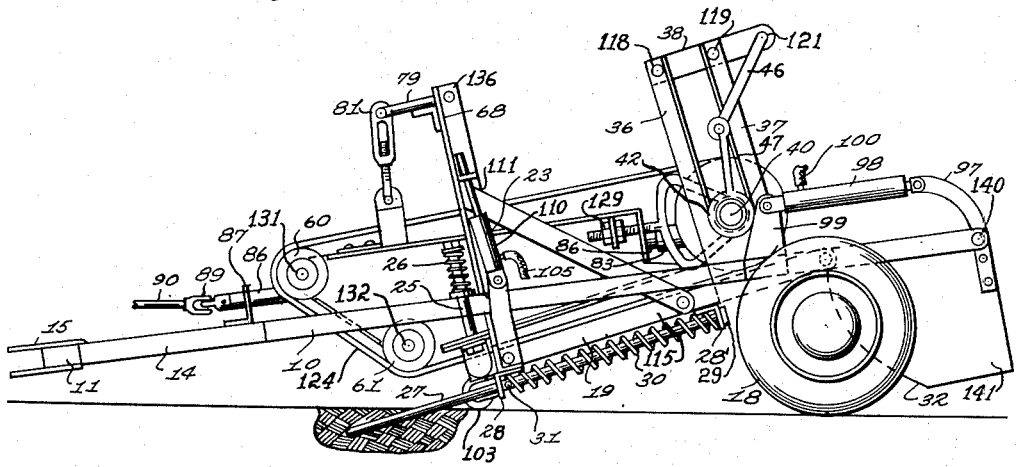
Figure 1 is a side elevation of a mobile stone picking machine illustrative of the invention.

With continued reference to the drawings, the machine comprises a substantially rectangular frame 10 formed of suitable material, such as channel iron, and of rigid construction. A tongue 11 extends forwardly from the front end cross member 12 of the frame substantially at the mid-length location of the cross member and is supported by diagonal braces 13 and 14 extending from the tongue near the front end of the latter to the opposite front corners of the frame.

A hitch structure 15 is secured on the front end of the tongue for attachment to the tow bar of a conventional farm tractor.

A pair of struts 16 projects downwardly from the frame at the rear end of the frame, and one at each side thereof, and a rear axle 17 is supported below the rear end of the frame by these struts. A pair of ground engaging wheels 18 is journaled on the rear axle, one at each end of the axle.

Figure 3:
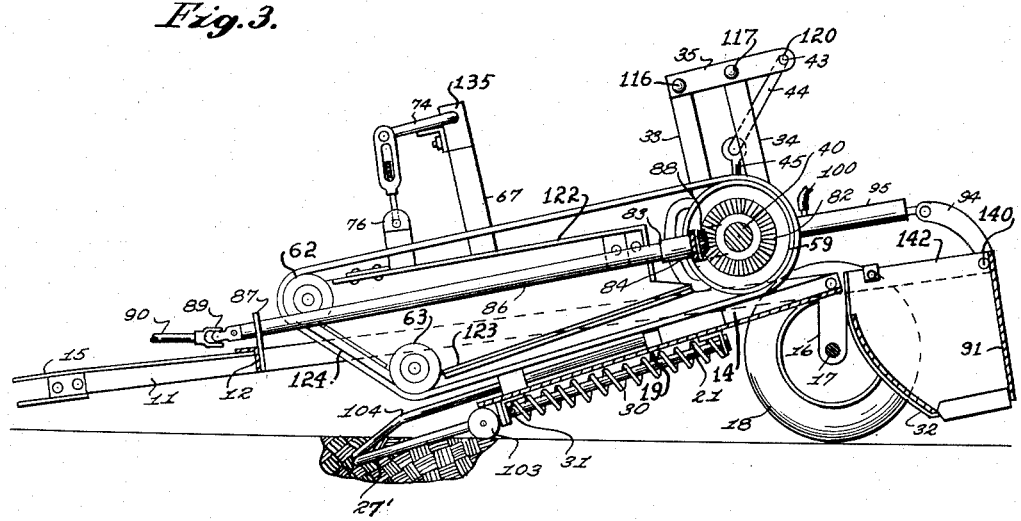
Figure 3 is a longitudinal cross section on the line 3—3 of Figure 2.
Figure 4:
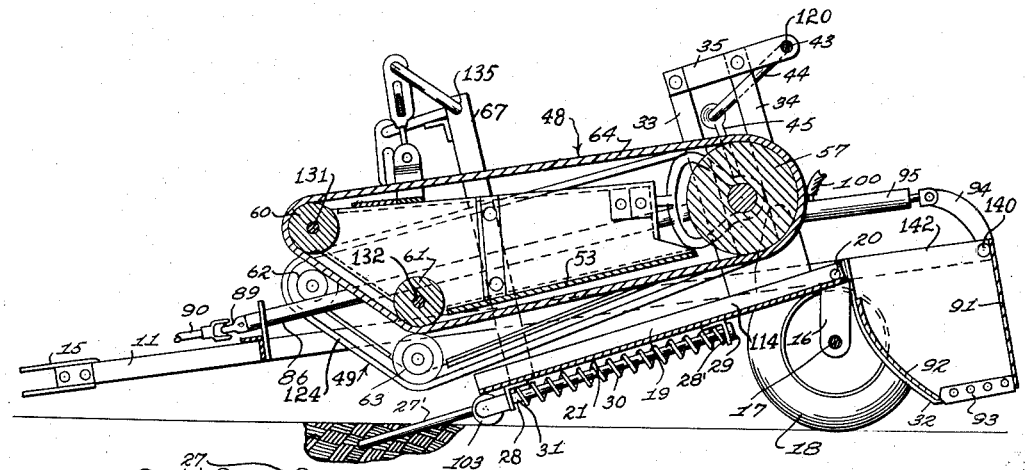
Figure 4 is a longitudinal cross section on the line 4—4 of Figure 2 showing one of the pair of conveyor structures of the machine elevated above the other of the pair of conveyor structures.
Figure 5:
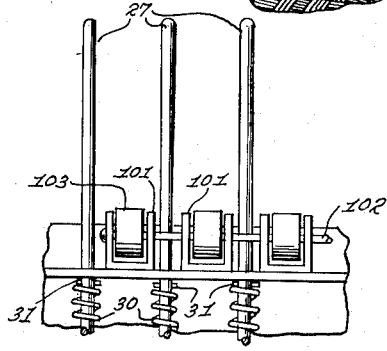
Figure 5 is a bottom plan view of a fragmentary portion of the machine showing a structural detail.

A sub-frame 19, somewhat shorter than the main frame 10, is pivotally connected at its rear end to the rear end of the main frame by suitable pivot pins 20, and a platform 21 is disposed within and supported by the sub-frame 19 immediately below the main frame 10. The sub-frame and platform normally incline downwardly and forwardly from the rear end of the main frame, as illustrated in Figures 3 and 4, and two hydraulic lift devices 22 and 23 are connected between the front end of the sub-frame, one at each side thereof, and the main frame for lifting the sub-frame to a location at which it is substantially disposed within the main frame. Each of the hydraulic lift devices includes a cylinder 110 pivotally supported on the sub-frame 19 and a reciprocable piston rod 111 carrying a piston head, not shown, connected to the main frame.

A guide assembly, generally designated by the reference numeral 25, is provided between the main frame 10 and the sub-frame 19 at the front end of the latter and contiguous to each side thereof, each guide assembly including a compression spring 26 for resiliently limiting movement of the front end of the sub-frame downwardly away from the main frame.

A plurality of stone picking fingers 27 are mounted below the platform 21 in spaced apart, substantially parallel relationship to each other and extend substantially parallel to the platform and forwardly of the front edge of the latter. These fingers are preferably in the form of long straight metal bars of circular cross-sectional shape and they extend ahead of the platform 21 and sub-frame 19 a distance such that when the sub-frame is in its lowered position, as illustrated in Figures 1, 3 and 4, the front ends of these fingers dig into the ground just ahead of the front end of the sub-frame and platform assembly. The spacing between these fingers is such that small pebbles will fall between the fingers and be left on the land, but all stones within a predetermined range of sizes will be lifted by the fingers and moved upwardly onto the platform 21 as the machine is moved forwardly over the area from which the stones are to be removed.

These fingers 27 are slidably mounted in apertures provided in two angle iron brackets 28 and 28' which extend transversely of the platform 21 with the bracket 28 at the front end, and the bracket 28' near the rear end of the platform. A head or nut 29 is provided on the rear end of each finger to bear against the rearward side of the rear bracket 28' and limit forward movement of the finger, and a compression spring 30 surrounds each finger between the two brackets 28 and 28'. The rear end of each spring bears against the rear bracket 28' while the front end of each spring bears against an abutment 31 carried by the corresponding finger so that rearward movement of the fingers is resiliently resisted by the springs 30. The strength of the springs 30 is such that the fingers will be held in their forwardly projected position to pick up stones within the predetermined range of sizes for which the machine is designed, but when one of the fingers encounters a more resistant obstruction, such as a large stone, stump or underground structure, it will be forced rearwardly against the force of its associated spring 30 and simultaneously have its front end moved upwardly because of the inclination of the finger to clear the obstruction, so the machine will not have to be stopped when the fingers encounter a resistant obstruction and the machine will not be broken or damaged.

With the construction so far described, stones will be lifted out of the ground by the fingers and pushed rearwardly on the fingers onto the platform 21. A suitable box or receptacle 32 is provided at the rear end of the receptacle to receive the stones, and power operated means are provided above the platform for moving the stones rearwardly over the platform from the fingers 27 into the box or receptacle 32.

A pair of standards 33 and 34 is secured at their bottom ends to the side member 114 of the main frame 10 and project upwardly substantially perpendicularly to the main frame. These standards are spaced apart and substantially parallel to provide a guideway at one side of the main frame 10, the purpose of which will be presently explained, and a bar 35 is connected by means of pins 116, 117 to the upper ends of the standards 33 and 34 and extends rearwardly of the rear standard 34. The standards 33 and 34 may be conveniently formed of angle iron members, and two similar standards 36 and 37 are secured at their lower ends to the side member 115 of the main frame 10 and project perpendicularly upwardly from the frame member 115 in spaced apart parallel relationship to provide a substantially vertical guideway at the other side of the main frame. A bar 38 is connected by means of pins 118, 119 to the upper ends of the two standards 36 and 37 and extends rearwardly of the rear standard 37. The two guide assemblies, above described, are positioned near the rear end of the main frame, and a conveyor shaft 40 extends transversely above the main frame near the rear end of the latter and has its ends slidably received in the two above described guide assemblies. A bearing sleeve or roller 41 is mounted on the shaft 40 at the end of the shaft disposed between the standards 33 and 34, and contacts these standards, while a similar bearing sleeve 42 is mounted on the shaft at its opposite end and disposed between the standards 36 and 37. The bars 35 and 38 are provided with apertures, designated by reference numerals 120, 121 respectively, near their rearward ends, and a rod 43 extends through and is journaled in the apertures 120, 121 in these bars. This rod 43 has, on the end adjacent the bar 35, a downwardly extending crank arm 44, the free end of which is connected by a link 45 to the adjacent end of the shaft 40, and has, on the end adjacent the bar 38, a similar crank arm 46, the free end of which is connected by a link 47 to the adjacent end of the shaft 40, the operation of the rod 43 and links 45 and 47 being to maintain the shaft 40 substantially parallel to the main frame and the platform 21 as this shaft rises and descends in the guideways provided by the standards 33—34 and 36—37. Two conveyor structures, generally indicated at 48 and 49, are pivotally connected at their rear ends to the shaft 40 by means to be subsequently described and extend forwardly from this shaft in side-by-side relationship to the front end of the main frame 10 and beyond the front end of the sub-frame 19 and platform 21.

Each of these conveyor structures comprises two spaced apart, substantially parallel side walls 50 and 51 spaced apart a distance less than one-half the width of the platform and symmetrically located relative to the corresponding longitudinal halves of the platform. These side walls are disposed substantially perpendicular to the platform 21, and are provided with outwardly extending flanges 122, 123, Figure 3, along their top and bottom edges, the top and bottom flanges of each side wall diverging at a small angle from the rear to the front end of the side wall, and the top flange 122 being longer than the bottom flange 123 so that the front edge of each side wall is inclined upwardly and forwardly, as is clearly illustrated in Figures 1, 3 and 4 and designated by the reference numeral 124. A flat bottom wall 53 is secured to the bottom edge flanges of the two side walls 50 and 51, and a reinforcing strut or brace 54, Figure 2, extends perpendicularly between the two side walls intermediate their length and is rigidly secured to the side walls at its opposite ends, the points of securement to the side walls 50, 51 being designated by the reference numerals 125, 126. In the case of the structure 48, particularly illustrated in Figure 2, an arm 55 extends rearwardly from the rear end of the side wall 50 and has the adjacent end secured thereto by bracket 127 and has the other end provided with an eye 128 surrounding the shaft 40, while a similar arm 56 extends rearwardly from the rear end of the side wall 51 and has the adjacent end secured thereto by a bracket 129 and has the other end provided with an eye 130 which also receives the shaft 40 near the left-hand end of the shaft. The arms 55 and 56 are spread apart at their rearward ends, and a large roller 57 is coaxially mounted on the shaft 40 between these arms.

Figure 2:
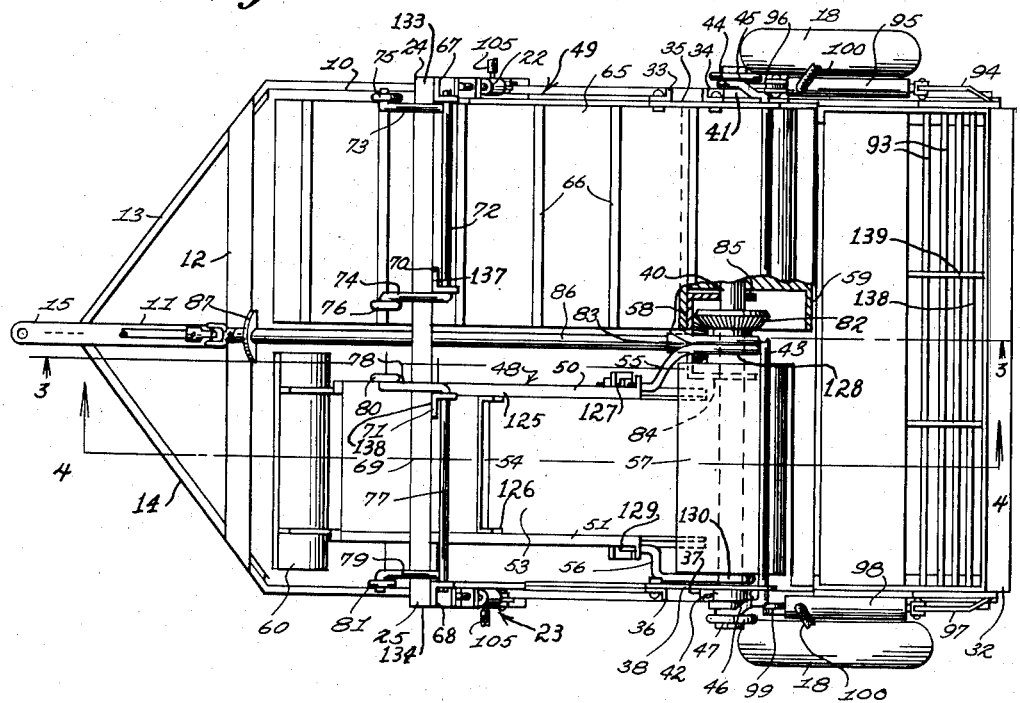
Figure 2 is a top plan view of the machine illustrated in Figure 1, a portion being broken away and shown in cross section to better illustrate the construction thereof.

The structure 49 is similar in all respects to the structure 48, and is pivotally connected at its rear end to the shaft 40 by means of arms similar to the arms 55 and 56, the arm corresponding to the arm 55 of the structure 48 being partially illustrated in Figure 2, and indicated at 58.

A large roller 59 is coaxially mounted on the shaft 40 between the pivot arms of the conveyor structure 49, and the rollers 57 and 59 constitute the rear rollers of two side-by-side conveyor assemblies.

A front upper roller 60 is journaled by means of a shaft 131 on the conveyor structure 48 at the front end of the upper edges of the side walls 50 and 51, and is substantially parallel to the roller 57, and a lower front roller 61 is journaled by means of a shaft 132 on the structure 48 at the front ends of the lower edges of the side walls 50 and 51, and is also substantially parallel to the rear roller 57. The structure 49 is similarly provided with an upper front roller 62, and a lower front roller 63. An endless flexible conveyor belt 64 is trained around the rollers 57, 60 and 61, and a similar endless conveyor belt 65 is trained around the rollers 59, 62 and 63.

With this arrangement, the rear ends of both conveyor assemblies are movable together toward and away from the platform 21, while the front ends of the two conveyor assemblies are individually movable toward and away from the platform. This provides free movement of the conveyor assemblies toward and away from the platform so that stones of different sizes and piles of stones and other debris can be passed through the machine without clogging or choking the machine.

In order to facilitate movement of the material such as stones and debris rearwardly of the platform 21 by the conveyor belts, these belts are provided with spaced apart, transversely extending slats or ridges 66 which engage the material on the platform and move it rearwardly, the conveyors being so driven that the upper flights of the conveyor belts move forwardly, and the lower flights, adjacent the platform, move rearwardly.

In order to guide the front ends of the conveyor assemblies in their upward and downward movements, a standard 67 is secured at its lower end to the side member 114 of the main frame 10 at a location near the front end of the main frame, and a similar standard 68 is secured at its lower end to the side member 115 of the main frame in a corresponding position. These standards 67 and 68 extend upwardly from the main frame side members 114, 115 substantially perpendicular to the latter, and a beam 69 is secured at its ends 133, 134 to the upper ends of the standards 67 and 68 and extends transversely of the machine above the conveyor assemblies.

The standards 67 and 68 are provided with apertures 135, 136 near their upper ends, and apertured angle brackets 70 and 71 are secured to the beam 69 at opposite sides of and contiguous to the mid-length location of the beam, the point of securement of the angle brackets 70, 71 being designated by reference numerals 137, 138. A crank rod 72 is journaled at one end in the standard 67, and at its opposite end in the bracket 70, and has at its opposite ends forwardly and downwardly extending cranks 73 and 74, the free ends of which are connected by the adjustable links 75 and 76 to the opposite sides of the conveyor structure 49. A similar crank rod 77 is rotatably supported at one end in the standard 68, and at its opposite end in the bracket 71, and has forwardly and downwardly extending cranks 78 and 79 at its opposite ends, the free ends of which cranks are connected by the adjustable links 80 and 81 to the opposite sides of the conveyor structure 48. The crank rods 72 and 77 maintain the front ends of the conveyor assemblies substantially parallel to the platform as these assemblies are raised and lowered by the passage of stones between the convyor assemblies and the platform, and the adjustable links provide a means for adjusting the distance between the platform and the front ends of the conveyor assemblies.

A large beveled gear 82 is secured on the shaft 40 substantially at the mid-length location of the shaft, and the end of the roller 59 adjacent the roller 57 is recessed to receive this gear. A bearing sleeve 83 is provided with a pair of spaced apart lugs 84 and 85 which receive the shaft 40 to support the bearing sleeve on the shaft while permitting free rotation of the shaft 40 relative to the bearing sleeve. The bearing sleeve 83 is positioned forwardly of the shaft 40, and with its rear end adjacent the periphery of the beveled gear 82, and a drive shaft 86 is journaled at one end in the bearing sleeve 83 and is rotatably supported near its opposite or front end in bracket 87 which is secured to the front cross member 12 of the main frame. A beveled pinion 88 is secured on the rear end of the drive shaft 86, and a universal joint 89 is secured on the front end of the drive shaft and connected to a drive rod 90 which extends to the power take-off connection of a tractor to which the stone picking machine is connected.

The receptacle or dump box 32 is an elongated hollow structure having an open top side, a substantially straight rear wall 91, an arcuately curved front wall 92, and an open-work bottom 93, Figure 2, preferably formed of spaced apart rods 138 supported by transverse battens 139 so that any earth carried into this box with the stones picked up by the machine will fall from the box back onto the land. The box is pivotally connected by pins 140 at its upper rear corners to the rear ends of the right and left-side frame members of the main frame, and the front wall 92 is curved on an arc centered on the common axis of the pivotal connections between the dump box and the machine frame. The box has straight end walls 141, 142 marginally joined to the rear, front and bottom walls, and an upwardly and forwardly curved arm 94 is secured to the end wall 142 adjacent the rear wall 91. An expansible chamber hydraulic device 95 is connected between the upper end of the arm 94 and the upper end of a bracket 96 which projects upwardly from the adjacent side member of the main frame. A similar upwardly and forwardly curved arm 97 is secured to the end wall 141 of the dump box near the rear wall 91, and an expansible chamber device 98 is connected between the upper end of the arm 97 and the upper end of a bracket 99 which projects upwardly from the adjacent side member of the main frame.

The two expansible chamber hydraulic devices 95 and 98 are connected by suitable hydraulic lines, as indicated at 100, by well-known means to a tractor hydraulic pump so that by operation of the tractor hydraulic control valve the expansible chamber devices 95 and 98 can be operated to dump the dump box 32 under the manual control of the operator.

With this arrangement, the stones can be picked up from the field or other area and deposited in the dump box 32 and when the box has received a sufficient quantity of stones, the machine can be taken to a selected location where the stones can be dumped. The dumped stones may be used for various purposes such as filling in ravines and depressions in the land, or may be moved from the area for use in various ways such as providing concrete aggregate.

A plurality of forwardly extending U-shaped brackets 101 are secured to the front side of the transversely extending angle bracket 27, and the legs of these brackets receive an axle shaft 102 extending longitudinally of the bracket 27 and transversely of the front edge of the platform 21 below the latter. One bracket 101 is mounted between each two adjacent fingers 27, and a roller 103 is disposed between the two legs of each bracket and journaled on the shaft 102. These rollers support the front edge of the platform and support the fingers 27 on the surface of the ground so that the front ends of the fingers do not dig into the ground beyond a predetermined extent.

A separator bar 104 is secured at its front end to the middle finger 27' at the front end of the latter, and extends rearwardly along this middle finger and above the platform 21 in the space between the two side-by-side conveyor assemblies to prevent stones from accumulating in this space.

The lift devices 22 and 23 also comprise a pair of expansible chamber hydraulic devices, and hydraulic lines, as indicated at 105, are provided for connecting these lift devices to the hydraulic pump of the tractor. When the lift devices 22 and 23 are operated, they lift the subframe 19, the platform 21 and the fingers 27 upwardly so that the front ends of the fingers are supported above the ground, and the machine can be transported from place-to-place without operating. During such transportation of the machine the power to the tractor power take-off connection will, of course, be discontinued.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a stone picking machine including a wheel supported frame, a platform disposed within and supported by said frame in a forwardly and downwardly inclined position, a conveyor mounted on said frame and disposed immediately above said platform, conveyor driving means carried by said frame, and a receptacle carried by said frame at the rear end of said platform to receive stones moved along said platform by said conveyor, apertured brackets disposed below said platform and extending transversely thereof, one near the front and one near the rear end of the platform, rod-like fingers slidably mounted in said brackets and disposed in spaced apart and substantially parallel relationship below said platform with their forwardly disposed ends projecting beyond the front end of said platform, springs connected one between each of said fingers and one of said brackets resiliently urging said fingers in a forward direction relative to said brackets and said platform, and limit stops carried one by each finger and engaging one of said brackets to limit the spring induced forward movement of said fingers relative to said brackets.

2. In a stone picking machine including a wheel supported frame, a platform disposed within and supported by said frame in a forwardly and downwardly inclined position, a conveyor mounted on said frame and disposed immediately above said platform, conveyor driving means carried by said frame, and a receptacle carried by said frame at the rear end of said platform to receive stones moved along said platform by said conveyor, apertured brackets disposed below said platform and extending transversely thereof, one near the front and one near the rear end of the platform, rod-like fingers slidably mounted in said brackets and disposed in spaced apart and substantially parallel relationship below said platform with their forwardly disposed ends projecting beyond the front end of said platform, springs connected one between each of said fingers and one of said brackets resiliently urging said fingers in a forward direction relative to said brackets and said platform, and limit stops carried one by each finger and engaging one of said brackets to limit the spring induced forward movement of said fingers relative to said brackets, said limit stops comprising heads on the rearwardly disposed ends of said fingers engaging the bracket adjacent the rear end of said platform.

3. In a stone picking machine including a wheel supported frame, a platform disposed within and supported by said frame in a forwardly and downwardly inclined position, a conveyor mounted on said frame and disposed immediately above said platform, conveyor driving means carried by said frame, and a receptacle carried by said frame at the rear end of said platform to receive stones moved along said platform by said conveyor, apertured brackets disposed below said platform and extending transversely thereof, one near the front and one near the rear end of the platform, rod-like fingers slidably mounted in said brackets and disposed in spaced apart and substantially parallel relationship below said platform with their forwardly disposed ends projecting beyond the front end of said platform, springs connected one between each of said fingers and one of said brackets resiliently urging said fingers in a forward direction relative to said brackets and said platform, and limit stops carried one by each finger and engaging one of said brackets to limit the spring induced forward movement of said fingers relative to said brackets, each of said springs comprising a coil compression spring surrounding the portion of the corresponding finger between said brackets.

HENRY J. HUHNE.

REFERENCES CITED

The following references are of record in the file of this patent:

UNITED STATES PATENTS

| Number | Name | Date |
|---|---|---|
| 990,726 | Gettman | Apr. 25, 1911 |
| 1,425,078 | Clark | Aug. 8, 1922 |
| 1,723,608 | Dott et al. | Aug. 6, 1929 |
| 2,042,193 | Schema | May 26, 1936 |
| 2,466,084 | Davis | Apr. 5, 1949 |
| 2,479,719 | Boylan | Aug. 23, 1949 |

FOREIGN PATENTS

| Number | Country | Date |
|---|---|---|
| 461,574 | France | Oct. 31, 1913 |